United States Patent
Zhao et al.

(10) Patent No.: US 10,491,914 B2
(45) Date of Patent: Nov. 26, 2019

(54) TRANSFORM INFORMATION PREDICTION

(71) Applicant: TENCENT AMERICA LLC, Palo Alto, CA (US)

(72) Inventors: Xin Zhao, San Diego, CA (US); Xiang Li, San Diego, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 16/232,757

(22) Filed: Dec. 26, 2018

(65) Prior Publication Data
US 2019/0306521 A1 Oct. 3, 2019

Related U.S. Application Data

(60) Provisional application No. 62/650,128, filed on Mar. 29, 2018.

(51) Int. Cl.
H04N 19/44 (2014.01)
H04N 19/105 (2014.01)
H04N 19/91 (2014.01)
H04N 19/593 (2014.01)
H04N 19/18 (2014.01)

(52) U.S. Cl.
CPC .......... *H04N 19/44* (2014.11); *H04N 19/105* (2014.11); *H04N 19/18* (2014.11); *H04N 19/593* (2014.11); *H04N 19/91* (2014.11)

(58) Field of Classification Search
CPC .... H04N 19/159; H04N 19/12; H04N 19/122; H04N 19/48; H04N 19/60; H04N 19/88
See application file for complete search history.

(56) References Cited

U.S. PATENT DOCUMENTS

2013/0188699 A1* 7/2013 Joshi ................... H03M 7/4006
                                                        375/240.12
2015/0103918 A1* 4/2015 Wang ................... H04N 19/159
                                                        375/240.24
2017/0324643 A1* 11/2017 Seregin ................. H04N 19/11
2018/0332289 A1* 11/2018 Huang ................. H04N 19/139

OTHER PUBLICATIONS

Sole, J., Joshi, R., Nguyen, N., Ji, T., Karczewicz, M., Clare, G., Henry, F. and Duenas, A., 2012. Transform coefficient coding in HEVC. IEEE Transactions on Circuits and Systems for Video Technology, 22(12), pp. 1765-1777. (Year: 2012).*
Zhang X, Au OC, Pang C, Dai W, Guo Y, Fang L. Additional sign bit hiding of transform coefficients in HEVC. In2013 IEEE International Conference on Multimedia and Expo Workshops (ICMEW) Jul. 15, 2013 (pp. 1-4). IEEE. (Year: 2013).*

* cited by examiner

*Primary Examiner* — Clifford Hilaire
(74) *Attorney, Agent, or Firm* — Sughrue Mion, PLLC

(57) ABSTRACT

A method of and an apparatus for controlling intra and/or inter prediction for decoding of a video sequence are provided. The method includes receiving a transform index which indicates a transform selection used for decoding an image block; binarizing a transform index using a preset number of bins; for each of a selected set of bins of the binarized transform index, identifying a group of non-zero transform coefficients in a transform coefficient block; and based on a value of a first bin of the selected set of bins of the binarized transform index and a value of a second bin of the selected set of bins of the binarized transform index, reversing a sign of the identified group of non-zero transform coefficients in the transform coefficient block.

17 Claims, 13 Drawing Sheets

| 0 | 0 | 0 | 0 | 0 | 0 | 0 | 0 |
|---|---|---|---|---|---|---|---|
| 1 | 0 | 0 | 0 | 0 | 0 | 0 | 0 |
| 5 | 1 | 0 | 0 | 0 | 0 | 0 | 0 |
| 2 | 7 | 0 | 0 | 0 | 0 | 0 | 0 |
| 4 | -2 | 0 | 0 | 0 | 0 | 0 | 0 |
| -9 | -6 | 1 | 1 | 0 | 0 | 0 | 0 |
| -7 | -4 | 0 | 0 | 0 | 0 | 0 | 0 |
| 13 | 11 | 5 | 4 | 0 | 0 | 0 | 0 |

FIG. 7

| 0 | 0 | 0 | 0 | 0 | 0 | 0 | 0 |
|---|---|---|---|---|---|---|---|
| -1 | 0 | 0 | 0 | 0 | 0 | 0 | 0 |
| 5 | 1 | 0 | 0 | 0 | 0 | 0 | 0 |
| -2 | 7 | 0 | 0 | 0 | 0 | 0 | 0 |
| 4 | -2 | 0 | 0 | 0 | 0 | 0 | 0 |
| -9 | 6 | -1 | 1 | 0 | 0 | 0 | 0 |
| 7 | 4 | 0 | 0 | 0 | 0 | 0 | 0 |
| 13 | -11 | -5 | 4 | 0 | 0 | 0 | 0 |

FIG. 8

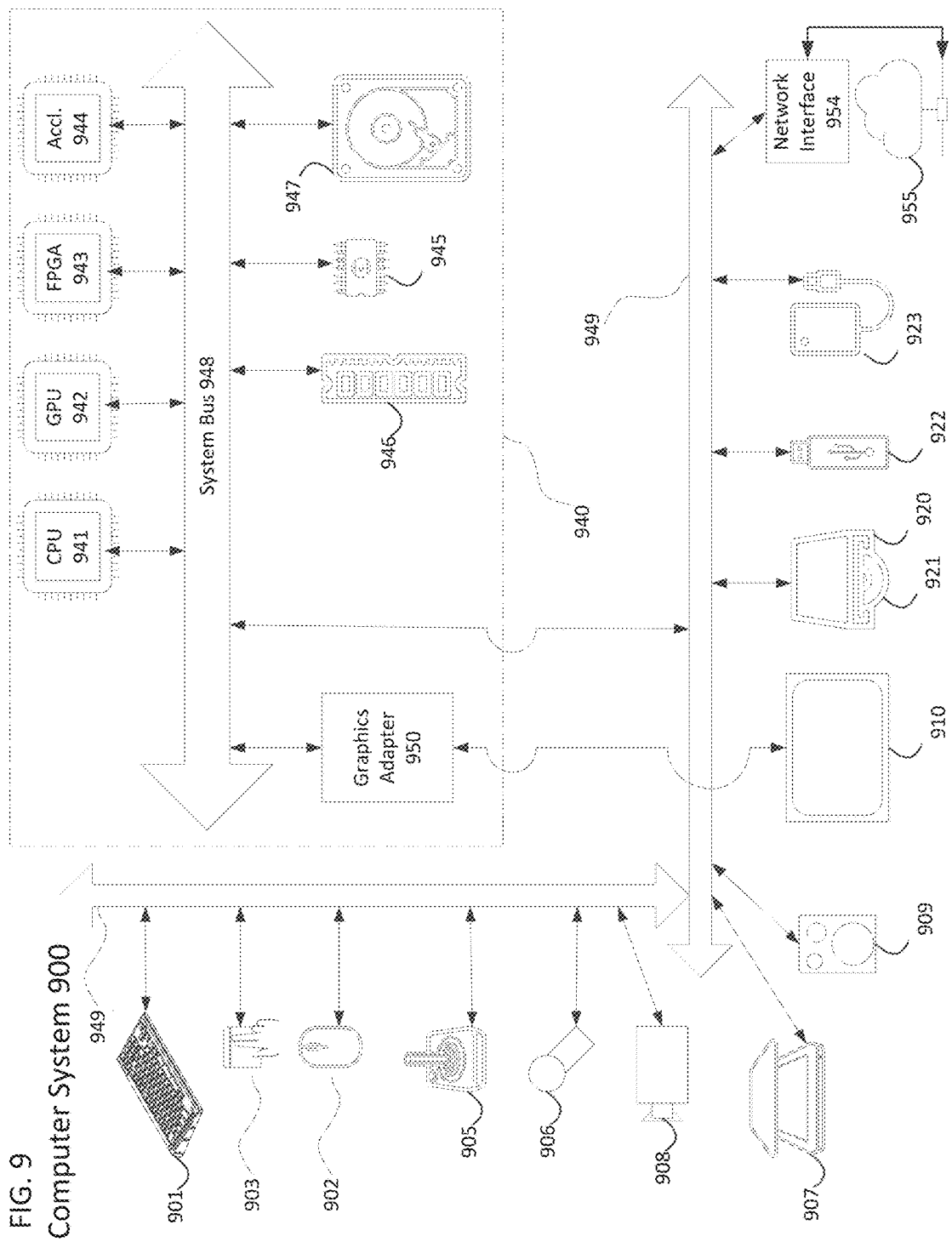

TRANSFORM INFORMATION PREDICTION

CROSS-REFERENCE TO RELATED APPLICATION

This application claims priority from U.S. Provisional Patent Application No. 62/650,128, filed on Mar. 29, 2018, in the United States Patent and Trademark Office, which is incorporated herein by reference in its entirety.

BACKGROUND

1. Field

Methods and apparatuses consistent with embodiments relate to video processing, and more particularly, methods and apparatuses for predicting the value of a coding mode, e.g., transform index.

2. Description of Related Art

ITU-T VCEG (Q6/16) and ISO/IEC MPEG (JTC 1/SC 29/WG 11) published the H.265/HEVC (High Efficiency Video Coding) standard in 2013 (version 1) 2014 (version 2) 2015 (version 3) and 2016 (version 4). Since then they have been studying the potential need for standardization of future video coding technology with a compression capability that significantly exceeds that of the HEVC standard (including its extensions). The groups are working together on this exploration activity in a joint collaboration effort known as the Joint Video Exploration Team (JVET) to evaluate compression technology designs proposed by their experts in this area. A Joint Exploration Model (JEM) has been developed by JVET to explore the video coding technologies beyond the capability of HEVC, and the current latest version of JEM is JEM-7.0.

In HEVC, a coding tree unit (CTU) is split into coding units (CUs) by using a quadtree structure denoted as coding tree to adapt to various local characteristics. The decision whether to code a picture area using inter-picture (temporal) or intra-picture (spatial) prediction is made at the CU level. Each CU can be further split into one, two or four prediction units (PUs) according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU. One of key feature of the HEVC structure is that it has the multiple partition conceptions including CU, PU, and TU. In HEVC, a CU or a TU can only be square shape, while a PU may be square or rectangular shape for an inter predicted block. In later stage of HEVC, some proposed to allow rectangular shape PUs for intra prediction and transform. These proposals were not adopted to HEVC but extended to be used in JEM.

At picture boundary, HEVC imposes implicit quad-tree split so that a block will keep quad-tree splitting until the size fits the picture boundary.

In HEVC, a CTU is split into CUs by using a quadtree structure denoted as coding tree to adapt to various local characteristics. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU. One of key feature of the HEVC structure is that it has the multiple partition conceptions including CU, PU, and TU.

The QTBT structure removes the concepts of multiple partition types, i.e. it removes the separation of the CU, PU and TU concepts, and supports more flexibility for CU partition shapes. In the QTBT block structure, a CU can have either a square or rectangular shape. As shown in FIG. 1A, a coding tree unit (CTU) is first partitioned by a quadtree structure. The quadtree leaf nodes are further partitioned by a binary tree structure. There are two splitting types, symmetric horizontal splitting and symmetric vertical splitting, in the binary tree splitting. The binary tree leaf nodes are called coding units (CUs), and that segmentation is used for prediction and transform processing without any further partitioning. This means that the CU, PU and TU have the same block size in the QTBT coding block structure. In the JEM, a CU sometimes consists of coding blocks (CBs) of different colour components, e.g. one CU contains one luma CB and two chroma CBs in the case of P and B slices of the 4:2:0 chroma format and sometimes consists of a CB of a single component, e.g., one CU contains only one luma CB or just two chroma CBs in the case of I slices. The following parameters are defined for the QTBT partitioning scheme: CTU size: the root node size of a quadtree, the same concept as in HEVC; MinQTSize: the minimum allowed quadtree leaf node size; MaxBTSize: the maximum allowed binary tree root node size; MaxBTDepth: the maximum allowed binary tree depth; MinBTSize: the minimum allowed binary tree leaf node size.

In one example of the QTBT partitioning structure, the CTU size is set as 128×128 luma samples with two corresponding 64×64 blocks of chroma samples, the MinQTSize is set as 16×16, the MaxBTSize is set as 64×64, the MinBTSize (for both width and height) is set as 4×4, and the MaxBTDepth is set as 4. The quadtree partitioning is applied to the CTU first to generate quadtree leaf nodes. The quadtree leaf nodes may have a size from 16×16 (i.e., the MinQTSize) to 128×128 (i.e., the CTU size). If the leaf quadtree node is 128×128, it will not be further split by the binary tree since the size exceeds the MaxBTSize (i.e., 64×64). Otherwise, the leaf quadtree node could be further partitioned by the binary tree. Therefore, the quadtree leaf node is also the root node for the binary tree and it has the binary tree depth as 0. When the binary tree depth reaches MaxBTDepth (i.e., 4), no further splitting is considered. When the binary tree node has width equal to MinBTSize (i.e., 4), no further horizontal splitting is considered. Similarly, when the binary tree node has height equal to MinBTSize, no further vertical splitting is considered. The leaf nodes of the binary tree are further processed by prediction and transform processing without any further partitioning. In the JEM, the maximum CTU size is 256×256 luma samples.

FIG. 1A (left) illustrates an example of block partitioning by using QTBT, and FIG. 1A (right) illustrates the corresponding tree representation. The solid lines indicate quadtree splitting and dotted lines indicate binary tree splitting. In each splitting (i.e., non-leaf) node of the binary tree, one flag is signalled to indicate which splitting type (i.e., horizontal or vertical) is used, where 0 indicates horizontal splitting and 1 indicates vertical splitting. For the quadtree splitting, there is no need to indicate the splitting type since quadtree splitting always splits a block both horizontally and vertically to produce 4 sub-blocks with an equal size.

In addition, the QTBT scheme supports the ability for the luma and chroma to have a separate QTBT structure. Currently, for P and B slices, the luma and chroma CTBs in one CTU share the same QTBT structure. However, for I slices, the luma CTB is partitioned into CUs by a QTBT structure, and the chroma CTBs are partitioned into chroma CUs by another QTBT structure. This means that a CU in an I slice consists of a coding block of the luma component or coding blocks of two chroma components, and a CU in a P or B slice consists of coding blocks of all three colour components.

In HEVC, inter prediction for small blocks is restricted to reduce the memory access of motion compensation, such that bi-prediction is not supported for 4×8 and 8×4 blocks, and inter prediction is not supported for 4×4 blocks. In the QTBT of the JEM, these restrictions are removed.

In addition to DCT-II and 4×4 DST-VII which have been employed in HEVC, an Adaptive Multiple Transform (AMT, or as known as Enhanced Multiple Transform (EMT)) scheme is used for residual coding for both inter and intra coded blocks. It uses multiple selected transforms from the DCT/DST families other than the current transforms in HEVC. The newly introduced transform matrices are DST-VII, DCT-VIII, DST-I and DCT-V. Table 1 shows the basis functions of the selected DST/DCT.

TABLE 1

Transform basis functions of DCT-II/V/VIII and DST-I/VII for N-point input

| Transform Type | Basis function $T_i(j)$, $i, j = 0, 1, \ldots, N-1$ |
|---|---|
| DCT-II | $T_i(j) = \omega_0 \cdot \sqrt{\dfrac{2}{N}} \cdot \cos\left(\dfrac{\pi \cdot i \cdot (2j+1)}{2N}\right)$ where $\omega_0 = \begin{cases} \sqrt{\dfrac{2}{N}} & i = 0 \\ 1 & i \neq 0 \end{cases}$ |
| DCT-V | $T_i(j) = \omega_0 \cdot \omega_1 \cdot \sqrt{\dfrac{2}{2N-1}} \cdot \cos\left(\dfrac{2\pi \cdot i \cdot j}{2N-1}\right)$, where $\omega_0 = \begin{cases} \sqrt{\dfrac{2}{N}} & i = 0 \\ 1 & i \neq 0 \end{cases}$, $\omega_1 = \begin{cases} \sqrt{\dfrac{2}{N}} & j = 0 \\ 1 & j \neq 0 \end{cases}$ |
| DCT-VIII | $T_i(j) = \sqrt{\dfrac{4}{2N+1}} \cdot \cos\left(\dfrac{\pi \cdot (2i+1) \cdot (2j+1)}{4N+2}\right)$ |
| DST-I | $T_i(j) = \sqrt{\dfrac{2}{N+1}} \cdot \sin\left(\dfrac{\pi \cdot (i+1) \cdot (j+1)}{N+1}\right)$ |
| DST-VII | $T_i(j) = \sqrt{\dfrac{4}{2N+1}} \cdot \sin\left(\dfrac{\pi \cdot (2i+1) \cdot (j+1)}{2N+1}\right)$ |

In order to keep the orthogonality of the transform matrix, the transform matrices are quantized more accurately than the transform matrices in HEVC, with 10-bit representation instead of 8-bit in HEVC. To keep the intermediate values of the transformed coefficients within the range of 16-bit, after horizontal and after vertical transform, all the coefficients are right shifted by 2 more bits, comparing to the right shift used in the current HEVC transforms.

The AMT applies to the CUs with both width and height smaller than or equal to 64, and whether AMT applies or not is controlled by a CU level flag. When the CU level flag is equal to 0, DCT-II is applied in the CU to encode the residue. For luma coding block within an AMT enabled CU, two additional flags are signalled to identify the horizontal and vertical transform to be used. As in HEVC, the residual of a block can be coded with transform skip mode in the JEM. To avoid the redundancy of syntax coding, the transform skip flag is not signalled when the CU level AMT flag is not equal to zero.

For intra residue coding, due to the different residual statistics of different intra prediction modes, a mode-dependent transform candidate selection process is used. Three transform subsets have been defined as shown in Table 2, and the transform subset is selected based on the intra prediction mode, as specified in Table 2.

TABLE 2

Three pre-defined transform candidate sets

| Transform Set | Transform Candidates |
|---|---|
| 0 | DST-VII, DCT-VIII |
| 1 | DST-VII, DST-I |
| 2 | DST-VII, DCT-VIII |

With the subset concept, a transform subset is first identified based on Table using the intra prediction mode of a CU with the CU-level AMT flag is equal to 1. After that, for each of the horizontal and vertical transform, one of the two transform candidates in the identified transform subset, according to in Table 3, is selected based on explicitly signalled with flags.

TABLE 3

Selected (H)orizontal and (V)ertical transform sets for each intra prediction mode

| Intra Mode | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| V | 2 | 1 | 0 | 1 | 0 | 1 | 0 | 1 | 0 | 1 | 0 | 1 | 0 | 1 | 0 | 0 | 0 | 0 |
| H | 2 | 1 | 0 | 1 | 0 | 1 | 0 | 1 | 0 | 1 | 0 | 1 | 0 | 1 | 2 | 2 | 2 | 2 |

| Intra Mode | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|
| V | 0 | 0 | 0 | 0 | 0 | 1 | 0 | 1 | 0 | 1 | 0 | 1 | 0 | 1 | 0 | 1 | 0 |
| H | 2 | 2 | 2 | 2 | 2 | 1 | 0 | 1 | 0 | 1 | 0 | 1 | 0 | 1 | 0 | 1 | 0 |

TABLE 3-continued

Selected (H)orizontal and (V)ertical transform sets for each intra prediction mode

| Intra Mode | 35 | 36 | 37 | 38 | 39 | 40 | 41 | 42 | 43 | 44 | 45 | 46 | 47 | 48 | 49 | 50 | 51 | 52 |
|---|---|---|---|---|---|---|---|---|---|---|---|---|---|---|---|---|---|---|
| V | 1 | 0 | 1 | 0 | 1 | 0 | 1 | 0 | 1 | 0 | 1 | 2 | 2 | 2 | 2 | 2 | 2 | 2 |
| H | 1 | 0 | 1 | 0 | 1 | 0 | 1 | 0 | 1 | 0 | 1 | 0 | 0 | 0 | 0 | 0 | 0 | 0 |

| Intra Mode | 53 | 54 | 55 | 56 | 57 | 58 | 59 | 60 | 61 | 62 | 63 | 64 | 65 | 66 |
|---|---|---|---|---|---|---|---|---|---|---|---|---|---|---|
| V | 2 | 2 | 1 | 0 | 1 | 0 | 1 | 0 | 1 | 0 | 1 | 0 | 1 | 0 |
| H | 0 | 0 | 1 | 0 | 1 | 0 | 1 | 0 | 1 | 0 | 1 | 0 | 1 | 0 |

For inter prediction residual, however, only one transform set, which consists of DST-VII and DCT-VIII, is used for all inter modes and for both horizontal and vertical transforms.

The complexity of AMT would be relatively high at the encoder side, since totally five (DCT-II and four multiple transform candidates) different transform candidates need to be evaluated with rate-distortion cost for each residual block when brute-force search is used. To alleviate this complexity issue at the encoder, several optimization methods are designed for algorithm acceleration in the JEM.

In JEM, a mode-dependent non-separable secondary transform (NSST) is applied between the forward core transform and quantization (at the encoder) and between the de-quantization and inverse core transform (at the decoder). To keep low complexity, NSST is only applied to the low frequency coefficients after the primary transform. If both width (W) and height (H) of a transform coefficient block is larger than or equal to 8, then 8×8 non-separable secondary transform is applied to the top-left 8×8 region of the transform coefficients block. Otherwise, if either W or H of a transform coefficient block is equal to 4, a 4×4 non-separable secondary transform is applied and the 4×4 non-separable transform is performed on the top-left min(8,W)×min(8,H) region of the transform coefficient block. The above transform selection rule is applied for both luma and chroma components.

Matrix multiplication implementation of a non-separable transform is described as follows using a 4×4 input block as an example. To apply the non-separable transform, the 4×4 input block X is represented as a vector $\vec{X}$:

$$X = \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix} \quad (1)$$

$$\vec{F} = [X_{00} X_{01} X_{02} X_{03} X_{10} X_{11} X_{12} X_{13} X_{20} X_{21} X_{22} X_{23} X_{30} X_{31} X_{32} X_{33}]^T \quad (2)$$

The non-separable transform is calculated as $\vec{F} = T \cdot \vec{X}$, where $\vec{F}$ indicates the transform coefficient vector, and T is a 16×16 transform matrix. The 16×1 coefficient vector $\vec{F}$ is subsequently re-organized as 4×4 block using the scanning order for that block (horizontal, vertical or diagonal). The coefficients with smaller index will be placed with the smaller scanning index in the 4×4 coefficient block. In JEM, a Hypercube-Givens Transform (HyGT) with butterfly implementation is used instead of matrix multiplication to reduce the complexity of non-separable transform.

There are totally 35×3 non-separable secondary transforms for both 4×4 and 8×8 block size, where 35 is the number of transform sets specified by the intra prediction mode, denoted as set, and 3 is the number of NSST candidate for each intra prediction mode. The mapping from the intra prediction mode to the transform set is defined in Table 4. The transform set applied to luma/chroma transform coefficients is specified by the corresponding luma/chroma intra prediction modes, according to Table 4. For intra prediction modes larger than 34 (diagonal prediction direction), the transform coefficient block is transposed before/after the secondary transform at the encoder/decoder.

For each transform set, the selected non-separable secondary transform candidate is further specified by the explicitly signalled CU-level NSST index. The index is signalled in a bitstream once per intra CU after transform coefficients and truncated unary binarization is used. The truncated value is 2 in case of planar or DC mode, and 3 for angular intra prediction mode. This NSST index is signalled only when there is more than one non-zero coefficient in a CU. The default value is zero when it is not signalled. Zero value of this syntax element indicates secondary transform is not applied to the current CU, values 1-3 indicates which secondary transform from the set should be applied.

In the JEM, NSST is not applied for a block coded with transform skip mode. When the NSST index is signalled for a CU and not equal to zero, NSST is not used for a block of a component that is coded with transform skip mode in the CU. When a CU with blocks of all components are coded in transform skip mode or the number of non-zero coefficients of non-transform-skip mode CBs is less than 2, the NSST index is not signalled for the CU.

It was proposed to forbid mixing NSST and EMT when using QTBT—effectively enforcing NSST to only be used with DCT2 as primary transform.

TABLE 4

Mapping from intra prediction mode to transform set index

| intra mode | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| set | 0 | 1 | 2 | 3 | 4 | 5 | 6 | 7 | 8 | 9 | 10 | 11 | 12 | 13 | 14 | 15 | 16 |
| intra mode | 34 | 35 | 36 | 37 | 38 | 39 | 40 | 41 | 42 | 43 | 44 | 45 | 46 | 47 | 48 | 49 | 50 |
| set | 34 | 33 | 32 | 31 | 30 | 29 | 28 | 27 | 26 | 25 | 24 | 23 | 22 | 21 | 20 | 19 | 18 |

TABLE 4-continued

Mapping from intra prediction mode to transform set index

| intra mode | 17 | 18 | 19 | 20 | 21 | 22 | 23 | 24 | 25 | 26 | 27 | 28 | 29 | 30 | 31 | 32 | 33 |
|---|---|---|---|---|---|---|---|---|---|---|---|---|---|---|---|---|---|
| set | 17 | 18 | 19 | 20 | 21 | 22 | 23 | 24 | 25 | 26 | 27 | 28 | 29 | 30 | 31 | 32 | 33 |
| intra mode | 51 | 52 | 53 | 54 | 55 | 56 | 57 | 58 | 59 | 60 | 61 | 62 | 63 | 64 | 65 | 66 | 67 (LM) |
| set | 17 | 16 | 15 | 14 | 13 | 12 | 11 | 10 | 9 | 8 | 7 | 6 | 5 | 4 | 3 | 2 | NULL |

A Hypercube-Givens Transform (HyGT) is used in the computation of the non-separable secondary transform. The basic elements of this orthogonal transform are Givens rotations, which are defined by orthogonal matrices G(m, n, θ), which have elements defined by $$G_{i,j}(m, n) = \begin{cases} \cos\theta, & i = j = m \text{ or } i = j = n, \\ \sin\theta, & i = m, j = n, \\ -\sin\theta, & i = n, j = m, \\ 1, & i = j \text{ and } i \neq m \text{ and } i \neq n, \\ 0, & \text{otherwise} \end{cases} \quad (3)$$

These transformations can be graphically represented as illustrated in FIG. 1B.

HyGT is implemented by combining sets of Givens rotations in a hypercube arrangement. FIG. 1C shows the "butterfly" shape flowchart of HyGT for 16 elements (4×4 non-separable transform). Assuming that N is a power of two, a HyGT round is defined as a sequence of log 2(N) passes, where in each pass, the indexes in vectors m and n are defined by edges of a hypercube with dimension log 2(N), sequentially in each direction.

To obtain good compression, more than one HyGT round are used. As shown in FIG. 1D, a full non-separable secondary transform is composed of R rounds HyGT, and may include an optional permutation pass, to sort transform coefficients according to their variance. In the JEM, 2-round HyGT is applied for 4×4 secondary transform and 4-round HyGT is applied for 8×8 secondary transform.

In transform coefficient coding, for each non-zero transform coefficient, a sign bit, i.e., 0 or 1, is usually bypass coded without context coding. A coefficient sign prediction scheme is proposed. Basically, given the N non-zero coefficient of which the signs are to be predicted, each possible sign combination is called a hypothesis, i.e., there are totally $2^N$ hypotheses. By trying each hypothesis with inverse transform and reconstruction, $2^N$ reconstructed blocks are derived, and the above and left boundary samples of each reconstructed block are compared to the above and left reconstructed neighboring blocks, the one which gives the minimum discontinuity across the block boundary is determined to be the prediction.

With the sign prediction, for each sign, instead of signaling "+" and "−", one bit, namely sign residual, indicating whether the prediction is correct or not, is signaled. The sign residual bit is coded using contexts which depend on the level value of the associated transform coefficient. Basically, large level value gives a higher chance of correct sign prediction. Two contexts are used depending on whether the dequantized level value is larger than a fixed threshold 600.

The boundary discontinuity can be measured using different cost functions, the cost is based on the absolute gradient value, as illustrated in FIG. 1E. A lower cost indicates a smoother transition among the reconstructed values across the block boundary.

Not only transform coefficient signs, other syntax elements, e.g., transform selection flags or indices, intra prediction directions, can also be predicted by trying different hypothesis and comparing the cost values based on boundary discontinuity.

SUMMARY

According to embodiments, a method of controlling intra prediction for decoding of a video sequence, is performed by at least one processor and includes receiving a transform index which indicates a transform selection used for decoding an image block; binarizing the transform index using a preset number of bins; for each of a selected set of bins of the binarized transform index, identifying a group of non-zero transform coefficients in a transform coefficient block; and based on a value of a first bin of the selected set of bins of the binarized transform index and a value of a second bin of the selected set of bins of the binarized transform index, reversing a sign of the identified group of non-zero transform coefficients in the transform coefficient block.

According to embodiments, an apparatus for controlling intra prediction for decoding of a video sequence, includes at least one memory configured to store computer program code, and at least one processor configured to access the at least one memory and operate according to the computer program code. The computer code includes receiving a transform index which indicates a transform selection used for decoding an image block. The computer program code further includes binarizing code configured to cause the at least one processor to binarize the transform index using a preset number of bins. The computer program code further includes identifying code configured to cause the at least one processor to, for each of a selected set of bins of the binarized transform index, identify a group of non-zero transform coefficients in a transform coefficient block. The computer program code further includes reversing code configured to cause the at least one processor to, based on a value of a first bin of the selected set of bins of the binarized transform index and a value of a second bin of the selected set of bins of the binarized transform index, reverse a sign of the identified group of non-zero transform coefficients in the transform coefficient block.

According to embodiments, a non-transitory computer-readable storage medium stores instructions that cause a processor to receive a transform index which indicates a transform selection used for decoding an image block; binarize the transform index using a preset number of bins; for each of a selected set of bins of the binarized transform index, identify a group of non-zero transform coefficients in a transform coefficient block; and based on a value of a first bin of the selected set of bins of the binarized transform index and a value of a second bin of the selected set of bins of the binarized transform index, reverse a sign of the identified group of non-zero transform coefficients in the transform coefficient block.

BRIEF DESCRIPTION OF THE DRAWINGS

Further features, the nature, and various advantages of the disclosed subject matter will be more apparent from the following detailed description and the accompanying drawings in which:

FIG. 7 is a diagram illustrating an example quantized transform coefficient block, according to an embodiment;

FIG. 8 is a diagram illustrating an example quantized transform coefficient block after reversal of signs;

FIG. 9 is a diagram of a computer system suitable for implementing embodiments.

DETAILED DESCRIPTION

Embodiments are directed to next-generation video coding technologies beyond HEVC, e.g., Versatile Video Coding (VVC). More specifically, a method on predicting the value of a coding mode, e.g., transform index is described.

Methods described herein may be used when multiple transforms can be applied for a residual block and a transform index is being signaled. For each bin of the binarized transform index value, a group of non-zero transform coefficients in the transform coefficient block are designated, and depending on the value of the bin, the sign values of the associated coefficients may be reversed so that a transform index may be represented by the reverse pattern of the sign values of the associated coefficients.

For example, if the transform index is binarized using two bits, for the first bin, the transform coefficients located at the even positions along the scanning order are designated, for the second bin, the transform coefficients located at the odd positions along the scanning order are designated. For each bin, if the bin value is 1, the signs of the associated/designated coefficients are reversed, otherwise, they are kept unchanged.

The predicted index value is derived by trying different values of transform index for the inverse transform and perform reconstruction, the hypothesis with minimum boundary cost value is determined as the predicted value. Given the predicted transform index, for each bin of the transform index, instead of signaling the actual value, a bin indicating whether the prediction value is correct or not is signaled, and this bin is context coded, wherein the context depends on the transform coefficients associated with this bin.

Figure 1A:
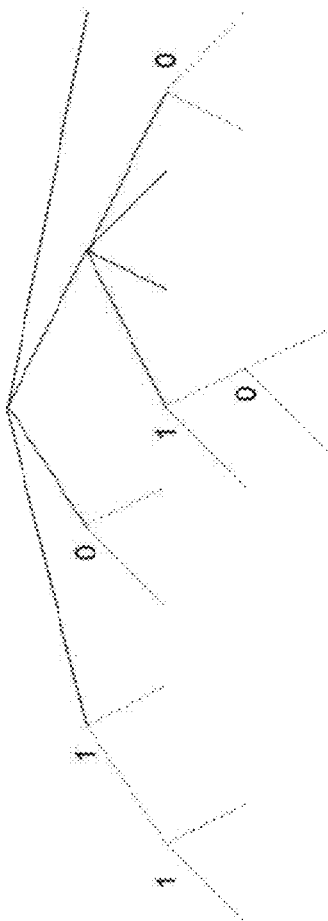
FIG. 1A is a diagram of a QTBT structure.
Figure 1A:
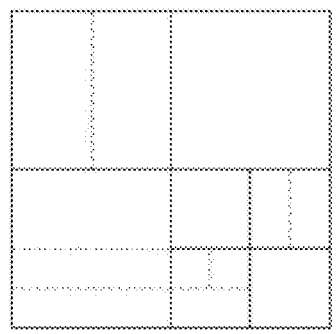
Figure 1B:
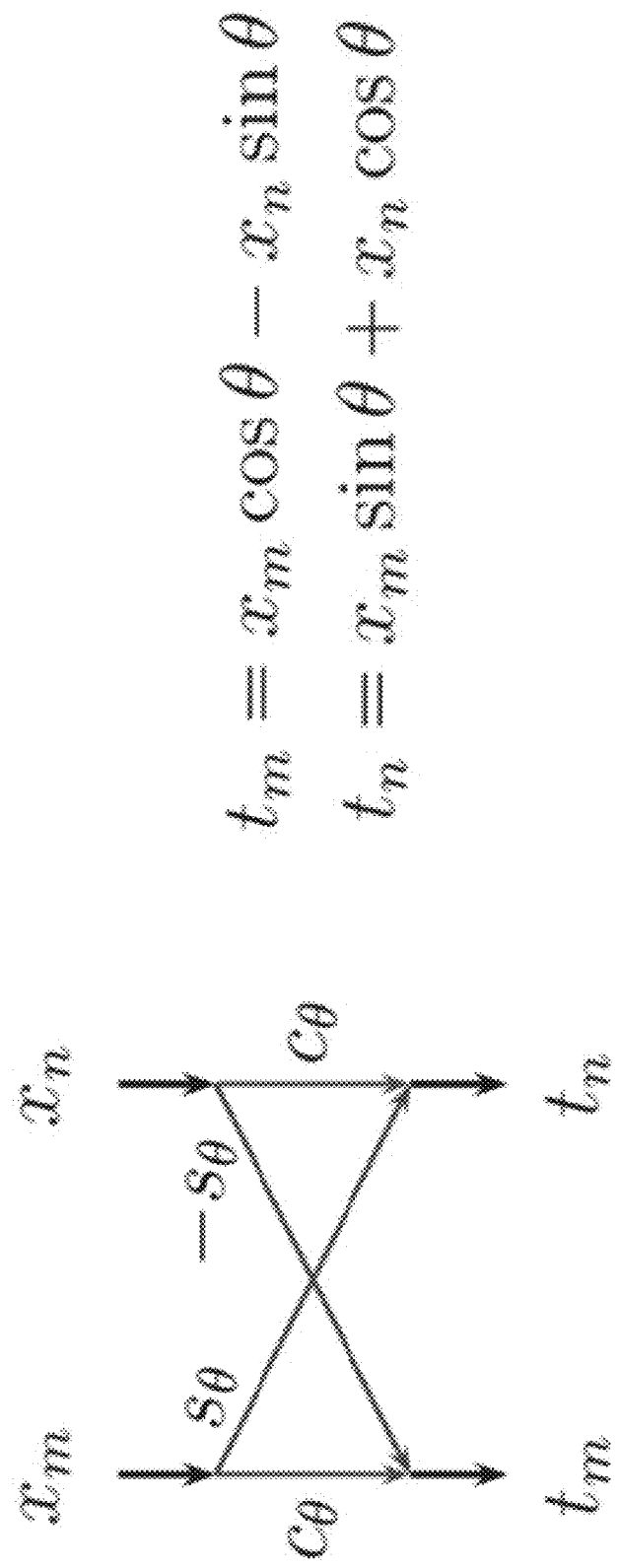
FIG. 1B is a diagram of a graphical representation of Givens rotations.
Figure 1C:
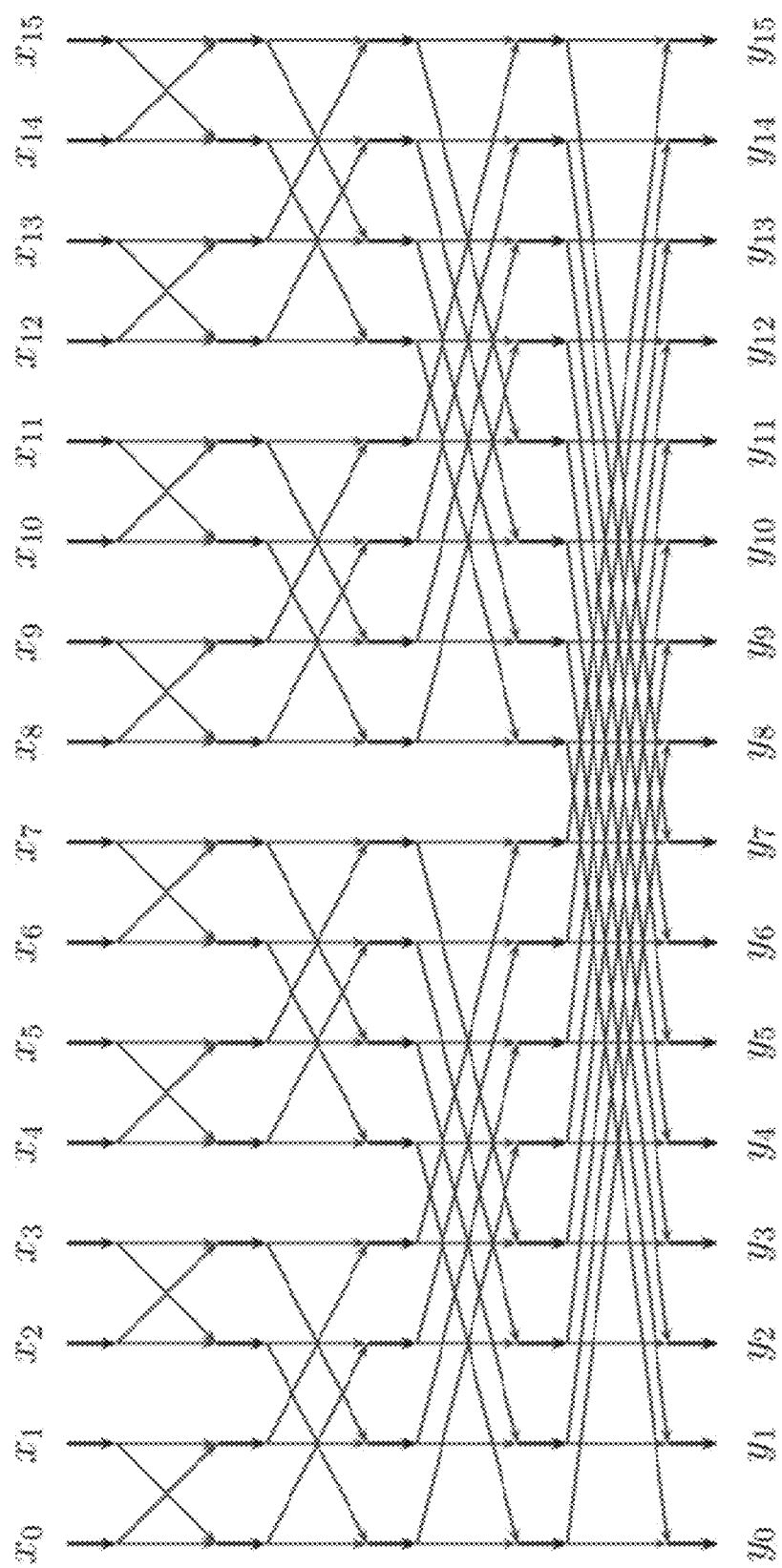
FIG. 1C is a diagram of HyGT defined by combinations of Givens rotations in a hypercube arrangement.
Figure 1D:
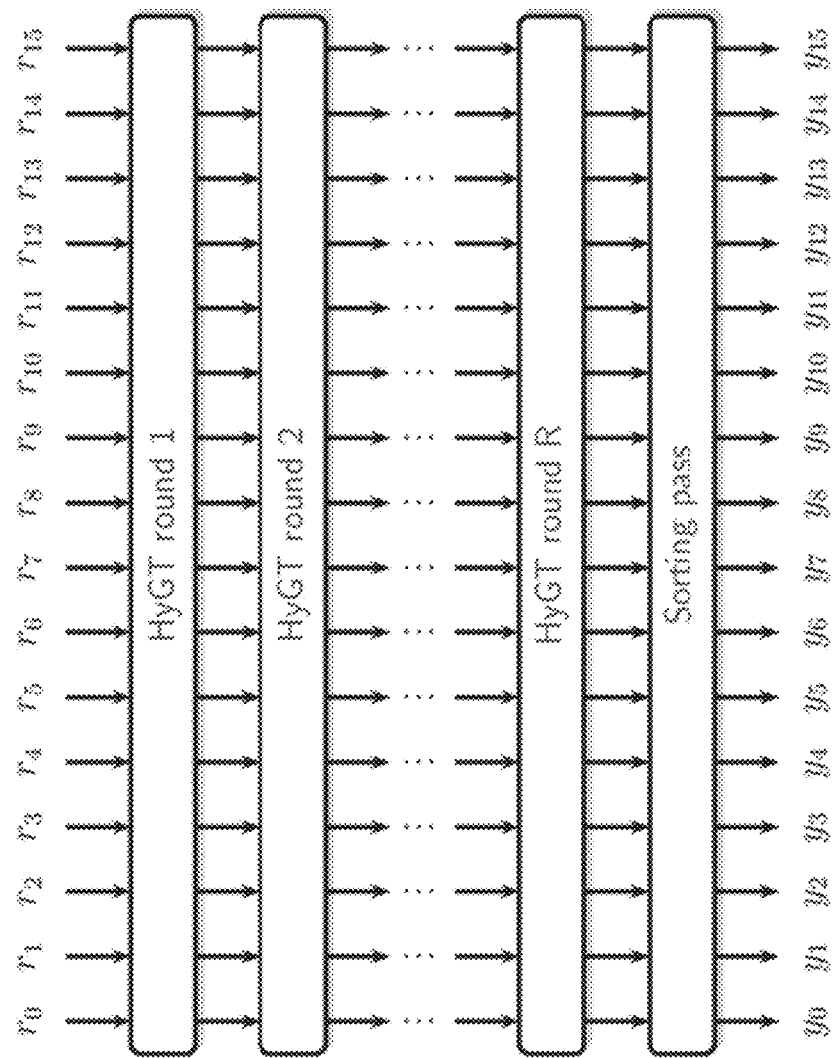
FIG. 1D is a diagram of HyGT defined by combinations of Givens rotations in a hypercube arrangement.
Figure 1E:
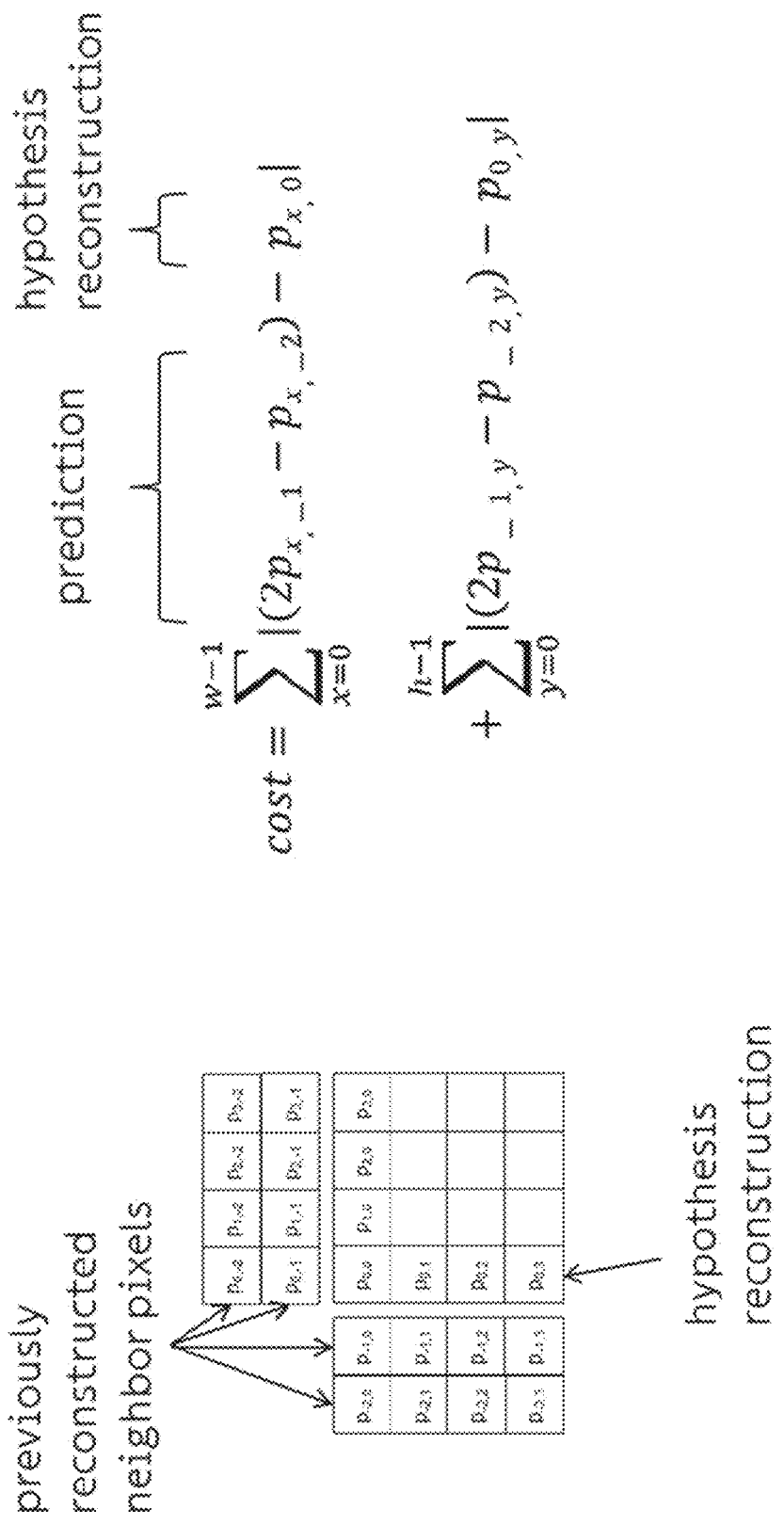
FIG. 1E is a diagram illustrating costing a hypothesis reconstructed border.
Figure 2:
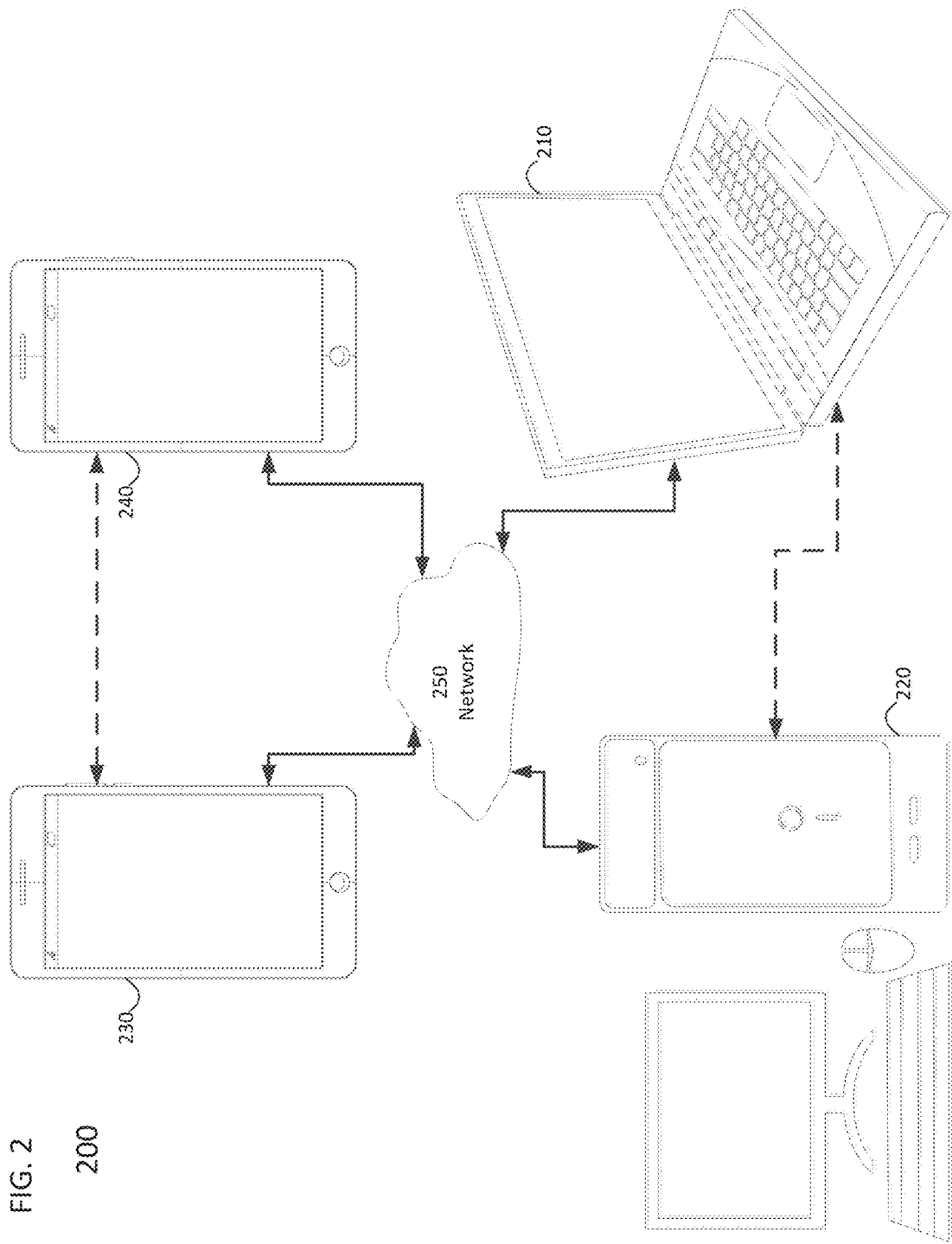
FIG. 2 is a simplified block diagram of a communication system according to an embodiment.

FIG. 2 illustrates a simplified block diagram of a communication system (200) according to an embodiment of the present disclosure. The communication system (200) may include at least two terminals (210-220) interconnected via a network (250). For unidirectional transmission of data, a first terminal (210) may code video data at a local location for transmission to the other terminal (220) via the network (250). The second terminal (220) may receive the coded video data of the other terminal from the network (250), decode the coded data and display the recovered video data. Unidirectional data transmission may be common in media serving applications and the like.

FIG. 2 illustrates a second pair of terminals (230, 240) provided to support bidirectional transmission of coded video that may occur, for example, during videoconferencing. For bidirectional transmission of data, each terminal (230, 240) may code video data captured at a local location for transmission to the other terminal via the network (250). Each terminal (230, 240) also may receive the coded video data transmitted by the other terminal, may decode the coded data and may display the recovered video data at a local display device.

In FIG. 2, the terminals (210-240) may be illustrated as servers, personal computers and smart phones but the principles of the present disclosure are not so limited. Embodiments of the present disclosure find application with laptop computers, tablet computers, media players and/or dedicated video conferencing equipment. The network (250) represents any number of networks that convey coded video data among the terminals (210-240), including for example wireline and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
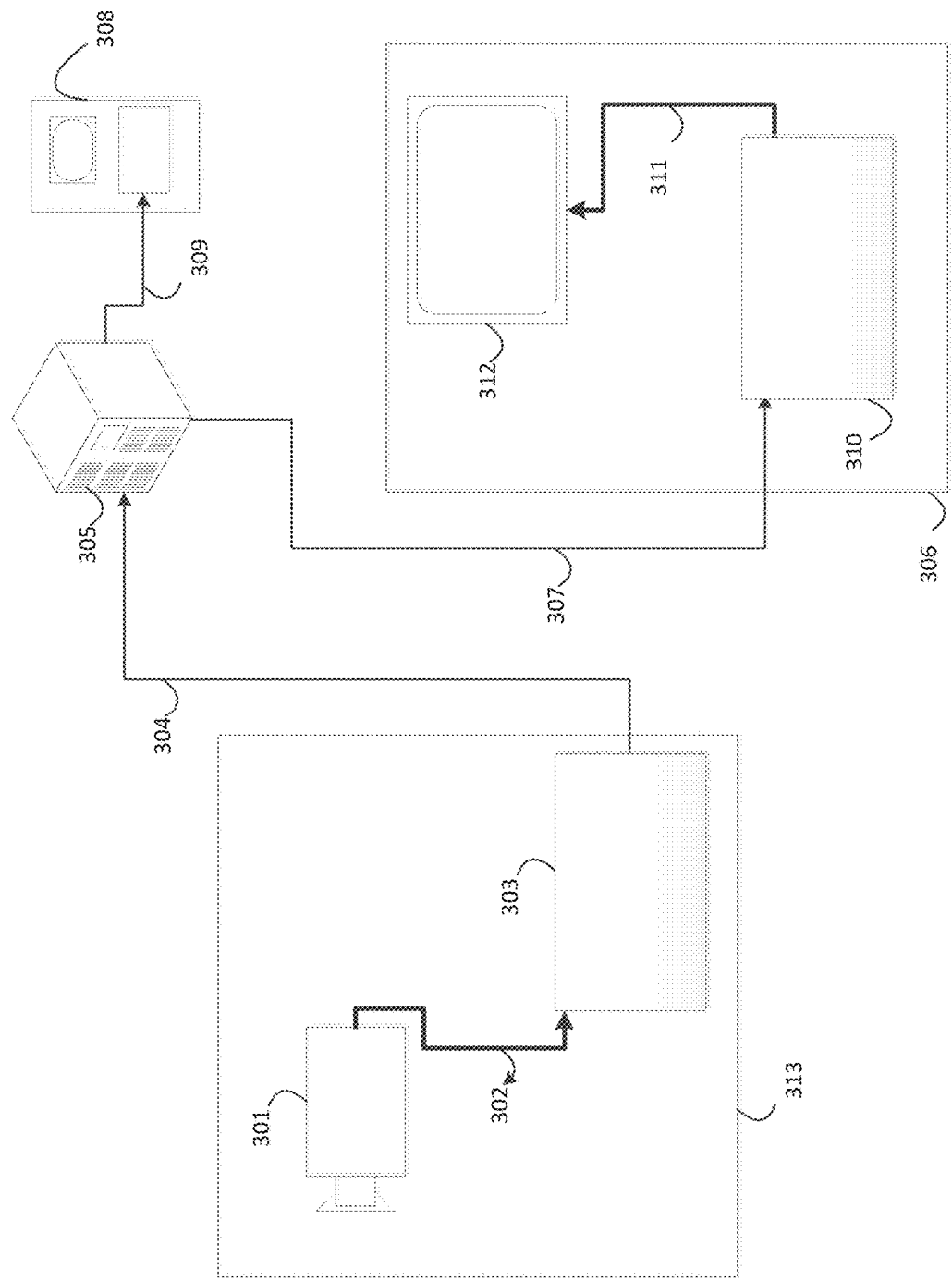
FIG. 3 is a diagram of a placement of a video encoder and a video decoder in a streaming environment, according to an embodiment.

FIG. 3 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating, for example, an uncompressed video sample stream (302). That sample stream (302), depicted as a bold line to emphasize a high data volume when compared to encoded video bitstreams, can be processed by an encoder (303) coupled to the camera 301). The encoder (303) can include hardware, software, or a combination thereof to enable or implement aspects of the disclosed subject matter as described in more detail below. The encoded video bitstream (304), depicted as a thin line to emphasize the lower data volume when compared to the sample stream, can be stored on a streaming server (305) for future use. One or more streaming clients (306, 308) can access the streaming server (305) to retrieve copies (307, 309) of the encoded video bitstream (304). A client (306) can include a video decoder (310) which decodes the incoming copy of the encoded video bitstream (307) and creates an outgoing video sample stream (311) that can be rendered on a display (312) or other rendering device (not depicted). In some streaming systems, the video bitstreams (304, 307, 309) can be encoded according to certain video coding/compression standards. Examples of those standards include ITU-T Recommendation H.265. Under development is a video coding standard informally known as Versatile Video Coding (VVC). The disclosed subject matter may be used in the context of VVC.

Figure 4:
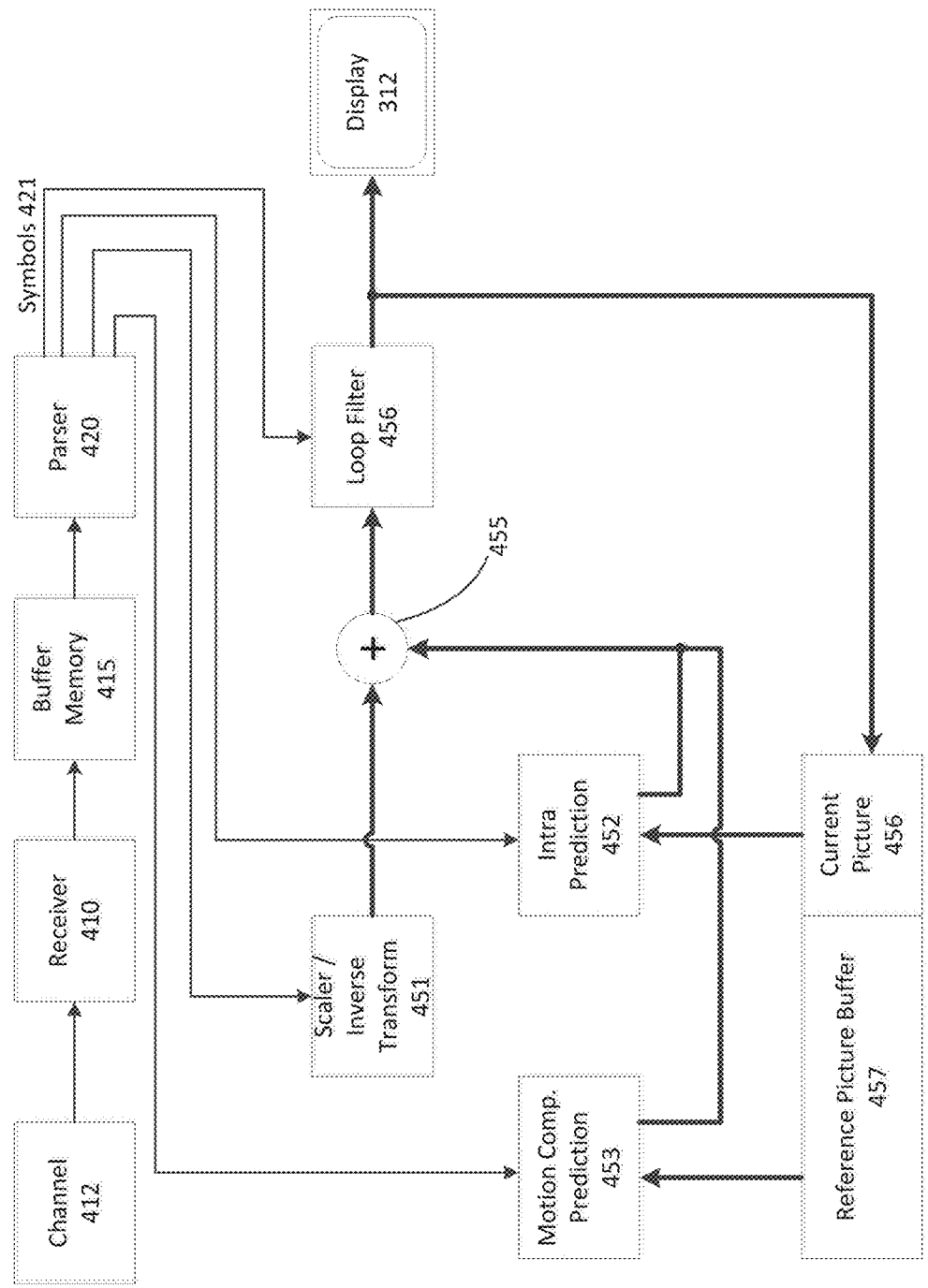
FIG. 4 is a functional block diagram of a video decoder according to an embodiment.

FIG. 4 may be a functional block diagram of a video decoder (310) according to an embodiment.

A receiver (410) may receive one or more codec video sequences to be decoded by the decoder (310); in the same or another embodiment, one coded video sequence at a time, where the decoding of each coded video sequence is independent from other coded video sequences. The coded video sequence may be received from a channel (412), which may be a hardware/software link to a storage device which stores the encoded video data. The receiver (410) may receive the encoded video data with other data, for example, coded audio data and/or ancillary data streams, that may be forwarded to their respective using entities (not depicted). The receiver (410) may separate the coded video sequence from the other data. To combat network jitter, a buffer memory (415) may be coupled in between receiver (410) and entropy decoder/parser (420) ("parser" henceforth). When receiver (410) is receiving data from a store/forward device of sufficient bandwidth and controllability, or from an isosychronous network, the buffer (415) may not be needed, or can be small. For use on best effort packet networks such as the Internet, the buffer (415) may be required, can be comparatively large and can advantageously of adaptive size.

The video decoder (310) may include a parser (420) to reconstruct symbols (421) from the entropy coded video sequence. Categories of those symbols include information used to manage operation of the decoder (310), and potentially information to control a rendering device such as a display (312) that is not an integral part of the decoder but can be coupled to it, as shown in FIG. 4. The control information for the rendering device(s) may be in the form of Supplementary Enhancement Information (SEI messages) or Video Usability Information (VUI) parameter set fragments (not depicted). The parser (420) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter (QP) values, motion vectors, and so forth.

The parser (420) may perform entropy decoding/parsing operation on the video sequence received from the buffer (415), so to create symbols (421). The parser (420) may receive encoded data, and selectively decode particular symbols (421). Further, the parser (420) may determine whether the particular symbols (421) are to be provided to a Motion Compensation Prediction unit (453), a scaler/inverse transform unit (451), an Intra Prediction Unit (452), or a loop filter (456).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, decoder (310) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives quantized transform coefficient as well as control information, including which transform to use, block size, quantization factor, quantization scaling matrices, etc. as symbol(s) (621) from the parser (420). It can output blocks comprising sample values, that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current (partly reconstructed) picture (456). The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a Motion Compensation Prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols (421) that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video bitstream and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (312) as well as stored in the reference picture memory (456) for use in future inter-picture prediction.

Certain coded pictures, once fully reconstructed, can be used as reference pictures for future prediction. Once a coded picture is fully reconstructed and the coded picture has been identified as a reference picture (by, for example, parser (420)), the current reference picture (656) can become part of the reference picture buffer (457), and a fresh current picture memory can be reallocated before commencing the reconstruction of the following coded picture.

The video decoder (310) may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (410) may receive additional (redundant) data with the encoded video. The additional data may be included as part of the coded video sequence(s). The additional data may be used by the video decoder (310) to properly decode the data and/or to more accurately reconstruct the original video data. Additional data can be in the form of, for example, temporal, spatial, or signal-to-noise ratio (SNR) enhancement layers, redundant slices, redundant pictures, forward error correction codes, and so on.

Figure 5:
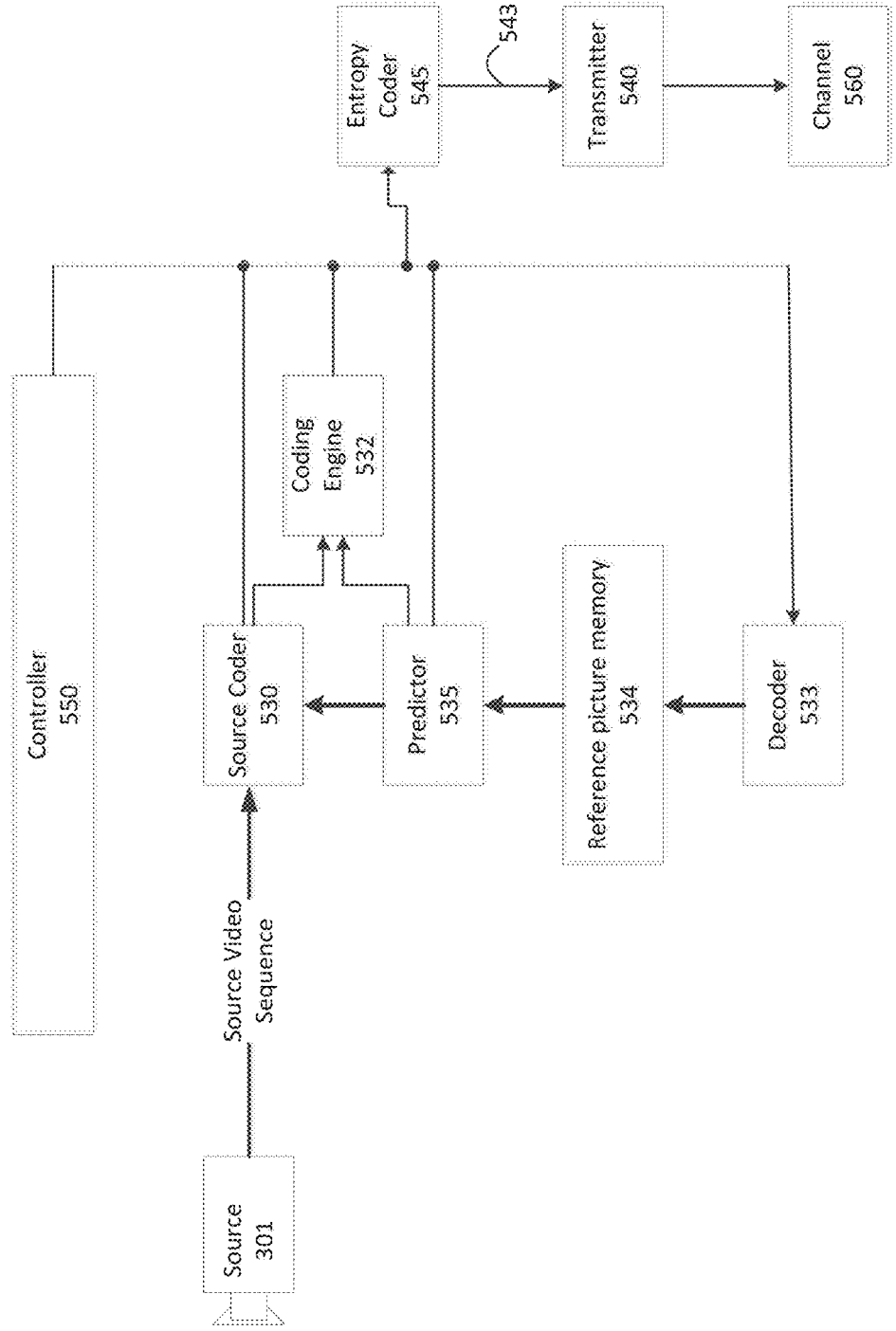
FIG. 5 is a functional block diagram of a video encoder according to an embodiment.

FIG. 5 is a functional block diagram of a video encoder (303) according to an embodiment of the present disclosure.

The encoder (303) may receive video samples from a video source (301) (that is not part of the encoder) that may capture video image(s) to be coded by the encoder (303).

The video source (301) may provide the source video sequence to be coded by the encoder (303) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (301) may be a storage device storing previously prepared video. In a videoconferencing system, the video source (303) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the encoder (303) may code and compress the pictures of the source video sequence into a coded video sequence (543) in real time or under any other time constraints as required by the application. Enforcing appropriate coding speed is one function of Controller (550). Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller (550) as they may pertain to video encoder (303) optimized for a certain system design.

Some video encoders operate in what a person skilled in the art readily recognizes as a "coding loop." As an oversimplified description, a coding loop can consist of the encoding part of an encoder (530) ("source coder" henceforth) (responsible for creating symbols based on an input picture to be coded, and a reference picture(s)), and a (local) decoder (533) embedded in the encoder (303) that reconstructs the symbols to create the sample data that a (remote) decoder also would create (as any compression between symbols and coded video bitstream is lossless in the video compression technologies considered in the disclosed subject matter). That reconstructed sample stream is input to the reference picture memory (534). As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder (533) can be the same as of a "remote" decoder (310), which has already been described in detail above in conjunction with FIG. 4. Briefly referring also to FIG. 5, however, as symbols are available and encoding/decoding of symbols to a coded video sequence by entropy coder (545) and parser (420) can be lossless, the entropy decoding parts of decoder (310), including channel (412), receiver (410), buffer (415), and parser (420) may not be fully implemented in local decoder (533).

An observation that can be made at this point is that any decoder technology except the parsing/entropy decoding that is present in a decoder also necessarily needs to be present, in substantially identical functional form, in a corresponding encoder. The description of encoder technologies can be abbreviated as they are the inverse of the comprehensively described decoder technologies. Only in certain areas a more detail description is required and provided below.

As part of its operation, the source coder (530) may perform motion compensated predictive coding, which codes an input frame predictively with reference to one or more previously-coded frames from the video sequence that were designated as "reference frames." In this manner, the coding engine (532) codes differences between pixel blocks of an input frame and pixel blocks of reference frame(s) that may be selected as prediction reference(s) to the input frame.

The local video decoder (533) may decode coded video data of frames that may be designated as reference frames, based on symbols created by the source coder (530). Operations of the coding engine (532) may advantageously be lossy processes. When the coded video data may be decoded at a video decoder, the reconstructed video sequence typically may be a replica of the source video sequence with some errors. The local video decoder (533) replicates decoding processes that may be performed by the video decoder on reference frames and may cause reconstructed reference frames to be stored in the reference picture cache (534). In this manner, the encoder (303) may store copies of reconstructed reference frames locally that have common content as the reconstructed reference frames that will be obtained by a far-end video decoder (absent transmission errors).

The predictor (535) may perform prediction searches for the coding engine (532). That is, for a new frame to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the video coder (530), including, for example, setting of parameters and subgroup parameters used for encoding the video data.

Output of all aforementioned functional units may be subjected to entropy coding in the entropy coder (545). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (540) may buffer the coded video sequence(s) as created by the entropy coder (545) to prepare it for transmission via a communication channel (560), which may be a hardware/software link to a storage device which would store the encoded video data. The transmitter (540) may merge coded video data from the video coder (530) with other data to be transmitted, for example, coded audio data and/or ancillary data streams (sources not shown).

The controller (550) may manage operation of the encoder (303). During coding, the controller (550) may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (303) may perform coding operations according to a predetermined video coding technology or standard, such as ITU-T Rec. H.265. In its operation, the video coder (303) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The video coder (530) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

Figure 6:
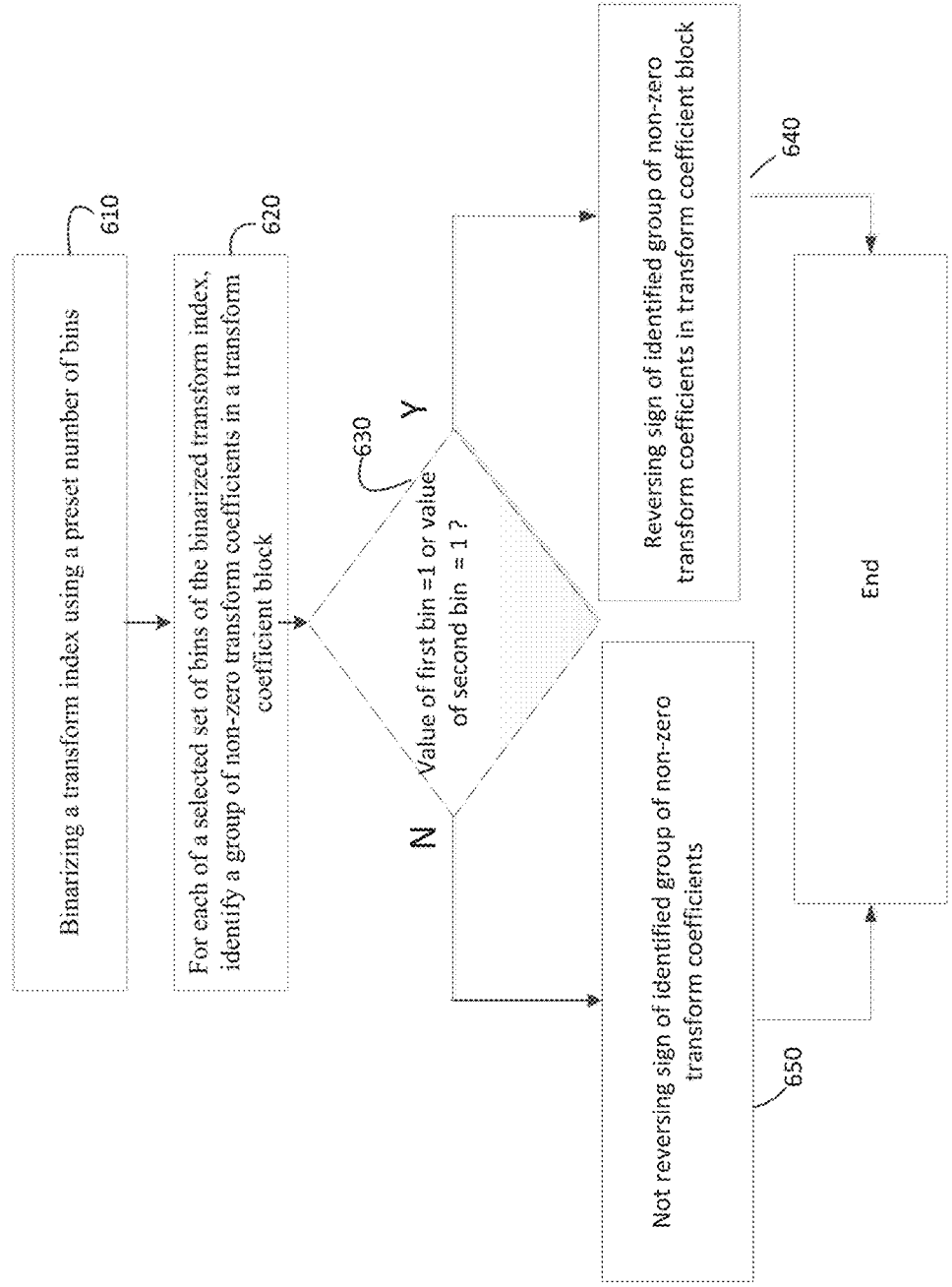
FIG. 6 is a flowchart illustrating a method of controlling intra prediction for decoding of a video sequence, according to an embodiment.

FIG. 6 is a flowchart illustrating a method (600) of controlling intra and/or inter prediction for decoding of a video sequence, according to an embodiment. In some implementations, one or more process blocks of FIG. 6 may be performed by the decoder (310). In some implementations, one or more process blocks of FIG. 6 may be performed by another device or a group of devices separate from or including the decoder (310), such as the encoder (303).

Referring to FIG. 6, in a first block (610), the method (600) includes binarizing a transform index using a preset number of bins. In a second block (620), the method (600) includes, for each of a selected set of bins of the binarized transform index, identifying a group of non-zero transform coefficients in a transform coefficient block.

In a third block (630), the method (600) includes determining whether a value of a first bin or second bin is equal to 1. If it is determined that a value of a first bin or second bin is equal to 1, the method includes reversing a sign of the identified group of non-zero transform coefficients in the transform coefficient block (640). Otherwise, the method does not reverse a sign of the identified group of non-zero transform coefficients in the transform coefficient block (650).

According to an embodiment, depending on the syntax element, one or multiple groups of non-zero transform coefficients in the transform coefficient block are identified and associated with each bin of the code word of the syntax element, and depending on the value of each bin of the code word of the syntax element, the associated coefficient signs may be reversed (the signs are changed from −1 to +1, or +1 to −1).

According to an embodiment, the selected syntax element may include or belong to, but not limited to primary transform index, secondary transform index, or an index indicating which combination of primary and secondary transform is used, or intra prediction mode. If a syntax element is predicted using this method, it is signaled after transform coefficients.

According to an embodiment, the selection on which transform coefficient signs are reversed may depend on the quantized or dequantized transform coefficient levels, positions of the transform coefficient within the transform coefficient block.

According to an embodiment, in one example, all the non-zero coefficients are put in an array in decreasing (or increasing) order of the magnitude values, if the transform index is binarized using two bins, for one bin, the signs of coefficients with even index in the array are reversed if the bin value is 1, and not reversed if the bin value is 0. For the other bin, the signs of coefficients with odd index in the array are reversed if the bin value is 1, and not reversed if the bin value is 0.

According to an embodiment, in another example, the non-zero coefficients are put in an array in order of a given scanning order, e.g., diagonal scan, raster scan, vertical scan, if the transform index is signaled using two bins, for one bin, the signs of coefficients with even index in the array are reversed if the bin value is 1, and not reversed if the bin value is 0. For the other bin, the signs of coefficients with odd index in the array are reversed if the bin value is 1, and not reversed if the bin value is 0.

According to an embodiment, in another example, only the transform coefficients with quantized or dequantized magnitude larger than a given or pre-defined threshold is considered for reversing the signs.

According to an embodiment, for entropy coding of a syntax element, one or multiple groups of non-zero transform coefficients in the transform coefficient block are identified, and the context used for entropy coding or parsing of the syntax element depends on the identified one or multiple groups of transform coefficients in the transform coefficient block.

According to an embodiment, for signaling a syntax element, instead of signaling the value directly, a prediction value of the syntax element is derived, and one or multiple bins indicating whether the prediction value is identical to the actual value or not is signaled. The one or multiple bins are context coded, and the context depends on the associated group of non-zero transform coefficients.

According to an embodiment, the selected syntax element may belong to, but not limited to primary transform index, secondary transform index, or an index indicating which combination of primary and secondary transform is used or an index indicating which combination of primary and secondary transform is used, or intra prediction mode, or any syntax element that is signaled after transform coefficients.

According to an embodiment, to derive the context used for entropy coding of the syntax element, the sum of quantized or dequantized non-zero coefficient magnitudes of the associated one or multiple groups of transform coefficients is calculated, then a context is selected by comparing the sum with one or multiple given thresholds. An example value of the given threshold is 600, or 1200.

According to an embodiment, the identification on one or multiple groups of transform coefficients may depend on the quantized or dequantized transform coefficient levels, positions of the transform coefficient.

According to an embodiment, in one example, the non-zero coefficients are put in an array in order of the magnitude values, if the transform index is represented using two bins, for one bin, the signs of coefficients with even index in the array are reversed if the bin value is 1, and not reversed if the bin value is 0. For the other bin, the signs of coefficients with odd index in the array are reversed if the bin value is 1, and not reversed if the bin value is 0.

According to an embodiment, in one example, the non-zero coefficients are put in an array in order of a given scanning order, e.g., diagonal scan, raster scan, vertical scan, if the transform index is signaled using two bins, for one bin, the signs of coefficients with even index in the array are reversed if the bin value is 1, and not reversed if the bin value is 0. For the other bin, the signs of coefficients with odd index in the array are reversed if the bin value is 1, and not reversed if the bin value is 0.

According to an embodiment, in one example, only the transform coefficients with quantized or dequantized magnitude larger than a given threshold is considered for reversing the signs.

According to an embodiment, in one example, a transform index, i.e., a syntax element called transform_index, is defined. The transform index value can be 0, 1, 2 or 3, and the transform index is represented using two bits integer. For each quantized transform coefficient block, the non-zero coefficients are put in an array in the decreasing order of their magnitudes. For example, in FIG. 7, an example of a quantized transform coefficient block is illustrated. As illustrated in FIG. 7, with the 8×8 quantized transform coefficient block, the non-zero quantized transform coefficients are put in an array coef as: coef={13, 11, −9, −7, 7, −6, 5, 5, 4, −4, 4, 2, −2, 1, 1, 1, 1}

If the first bin of transform_index is signaled as 1, the signs of transform coefficients with even index (i.e., the coefficients in the shaded positions in FIG. 7) in array coef are reversed. If the second bin of transform_index is signaled as 1, the signs of transform coefficients with odd index (i.e., the coefficients in the not shaded positions in FIG. 7) in array coef are reversed.

FIG. 8 illustrates an example quantized transform coefficient block after reversal of signs. In one example, if the transform index is 2, i.e., binarized as "10", then the quantized transform coefficient block as shown in FIG. 7 is modified as the transform coefficient block shown in FIG. 8.

According to an embodiment, in one example, a prediction on transform index, i.e., a syntax element called pred_transform_index, is signaled for current block. The prediction on transform index can be 0, 1, 2 or 3, the first bin (e0) indicates whether the predicted first bin of transform_index is same with the actual value, and the second bin (e1) indicates whether the predicted second bin of transform_index is same with the actual value.

According to an embodiment, given the predicted value of bin 0 and bin 1 of the transform_index, i.e., p0 and p1, then the decoded first bin of transform_index is t0=b0^e0, and the decoded second bin of transform_index is t1=b1^e1, where "^" indicates XOR operation. Finally the transform index value is reconstructed as (t1)<<1+t0.

According to an embodiment, the first bin (e0) of pred_transform_index is context coded, and the context is derived by the non-zero transform coefficients in the shaded positions of FIG. 8. To derive the context, the quantized transform coefficient block is first dequantized, then the sum of level values of the the non-zero transform coefficients in the shaded positions is calculated, if the sum is less than a given threshold, e.g., 600, or 1200, a context is selected, if the sum is larger than a given threshold, another context is selected.

Similarly, the second bin (e1) of pred_transform_index is context coded, and the context is derived by the non-zero transform coefficients in the non-shaded positions of FIG. 8. To derive the context, the quantized transform coefficient block is first dequantized, then the sum of level values of the the non-zero transform coefficients in the shaded positions is calculated, if the sum is less than a given threshold, e.g., 600, or 1200, a context is selected, if the sum is larger than a given threshold, another context is selected.

Methods described herein may be implemented by processing circuitry (e.g., one or more processors or one or more integrated circuits). In one example, the one or more processors execute a program that is stored in a non-transitory computer-readable medium to perform one or more of the methods.

The techniques described above, can be implemented as computer software using computer-readable instructions and physically stored in one or more computer-readable media. For example, FIG. 9 shows a computer system 900 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 9 for computer system 900 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 900.

Computer system 900 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 901, mouse 902, trackpad 903, touch screen 910, data-glove 904, joystick 905, microphone 906, scanner 907, camera 908.

Computer system 900 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 910, data-glove 904, or joystick 905, but there can also be tactile feedback devices that do not serve as input devices), audio output devices (such as: speakers 909, headphones (not depicted)), visual output devices (such as screens 910 to include cathode ray tube (CRT) screens, liquid-crystal display (LCD) screens, plasma screens, organic light-emitting diode (OLED) screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 900 can also include human accessible storage devices and their associated media such as optical media including CD/DVD ROM/RW 920 with CD/DVD or the like media 921, thumb-drive 922, removable hard drive or solid state drive 923, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 900 can also include interface(s) to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include global systems for mobile communications (GSM), third generation (3G), fourth generation (4G), fifth generation (5G), Long-Term Evolution (LTE), and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (949) (such as, for example universal serial bus (USB) ports of the computer system 900; others are commonly integrated into the core of the computer system 900 by attachment to a system bus as described below (for example Ethernet interface into a PC computer system or cellular network interface into a smartphone computer system). Using any of these networks, computer system 900 can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 940 of the computer system 900.

The core 940 can include one or more Central Processing Units (CPU) 941, Graphics Processing Units (GPU) 942, specialized programmable processing units in the form of Field Programmable Gate Areas (FPGA) 943, hardware accelerators for certain tasks 944, and so forth. These devices, along with Read-only memory (ROM) 945, Random-access memory (RAM) 946, internal mass storage such as internal non-user accessible hard drives, solid-state drives (SSDs), and the like 947, may be connected through a system bus 948. In some computer systems, the system bus 948 can be accessible in the form of one or more physical plugs to enable extensions by additional CPUs, GPU, and the like. The peripheral devices can be attached either directly to the core's system bus 948, or through a peripheral bus 949. Architectures for a peripheral bus include peripheral component interconnect (PCI), USB, and the like.

CPUs 941, GPUs 942, FPGAs 943, and accelerators 944 can execute certain instructions that, in combination, can make up the aforementioned computer code. That computer code can be stored in ROM 945 or RAM 946. Transitional data can be also be stored in RAM 946, whereas permanent data can be stored for example, in the internal mass storage 947. Fast storage and retrieve to any of the memory devices can be enabled through the use of cache memory, that can be closely associated with one or more CPU 941, GPU 942, mass storage 947, ROM 945, RAM 946, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 900, and specifically the core 940 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 940 that are of non-transitory nature, such as core-internal mass storage 947 or ROM 945. The software implementing various embodiments of the present disclosure can be stored in such devices and executed by core 940. A computer-readable medium can include one or more memory devices or chips, according to particular needs. The software can cause the core 940 and specifically the processors therein (including CPU, GPU, FPGA, and the like) to execute particular processes or particular parts of particular processes described herein, including defining data structures stored in RAM 946 and modifying such data structures according to the processes defined by the software. In addition or as an alternative, the computer system can provide functionality as a result of logic hardwired or otherwise embodied in a circuit (for example: accelerator 944), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

The invention claimed is:

1. A method of controlling intra prediction for decoding of a video sequence, the method being performed by at least one processor, and the method comprising:
    receiving a transform index which indicates a transform selection used for decoding an image block;
    binarizing the transform index using a preset number of bins;
    for each of a selected set of bins of the binarized transform index, identifying a group of non-zero transform coefficients in a transform coefficient block;
    based on a value of a first bin of the selected set of bins of the binarized transform index and a value of a second bin of the selected set of bins of the binarized transform index, reversing a sign of the identified group of non-zero transform coefficients in the transform coefficient block;
    adding the non-zero transform coefficients to an array according to a preset order;
    comparing a sum of magnitudes of the non-zero transform coefficients to a threshold value; and
    selecting a context for coding each bin of the transform index based on the comparing,
    wherein when the sum of the magnitudes of the non-zero transform coefficients are greater than the threshold value, a first context is selected, and when the sum of the magnitudes of the non-zero transform coefficients are less than the threshold value, a second context is selected.

2. The method of claim 1, further comprising:
    reversing the sign of the non-zero transform coefficients based on an ordering of the non-zero transform coefficients in the array.

3. The method of claim 1, further comprising:
    reversing the sign of the non-zero transform coefficients in an even position of the array when the value of the first bin is one; and
    reversing the sign of the non-zero transform coefficients in an odd position of the array when the value of the second bin is one.

4. The method of claim 1, further comprising:
    adding the non-zero transform coefficients to the array according to a decreasing order of magnitude values of the non-zero transform coefficients;
    reversing the sign of the non-zero transform coefficients in an even position of the array when the value of the first bin is one; and
    reversing the sign of the non-zero transform coefficients in an odd position of the array when the value of the second bin is one.

5. The method of claim 1, further comprising:
    adding the non-zero transform coefficients to the array according to an increasing order of magnitude values of the non-zero transform coefficients;
    reversing the sign of the non-zero transform coefficients in an even position of the array when the value of the first bin is one; and
    reversing the sign of the non-zero transform coefficients in an odd position of the array when the value of the second bin is one.

6. The method of claim 1, further comprising:
    adding the non-zero transform coefficients to the array according to a preset scanning order;
    reversing the sign of the non-zero transform coefficients in an even position of the array when the value of the first bin is one; and reversing the sign of the non-zero transform coefficients in an odd position of the array when the value of the second bin is one.

7. The method of claim 6, wherein the preset scanning order is one from among a diagonal scan, a horizontal scan, and a vertical scan.

8. The method of claim 1, further comprising:
comparing a magnitude of each non-zero transform coefficient to a second threshold value; and
not reversing a non-zero transform coefficient when the magnitude of the non-zero transform coefficient is below the second threshold value.

9. An apparatus for controlling intra prediction for decoding of a video sequence, the apparatus comprising:
at least one memory configured to store computer program code; and
at least one processor configured to access the at least one memory and operate according to the computer program code, the computer program code comprising:
receiving code configured to cause the at least one processor to receive a transform index which indicates a transform selection used for decoding an image block;
binarizing code configured to cause the at least one processor to binarize a transform index using a preset number of bins;
identifying code configured to cause the at least one processor to, for each of a selected set of bins of the binarized transform index, identify a group of non-zero transform coefficients in a transform coefficient block;
reversing code configured to cause the at least one processor to, based on a value of a first bin of the selected set of bins of the binarized transform index and a value of a second bin of the selected set of bins of the binarized transform index, reverse a sign of the identified group of non-zero transform coefficients in the transform coefficient block;
adding code configured to cause the at least one processor to add the non-zero transform coefficients to an array according to a preset order;
comparing code configured to cause the at least one processor to compare a sum of magnitudes of the non-zero transform coefficients to a threshold value; and
selecting code configured to cause the at least one processor to select a context for coding each bin of the transform index based on the comparing,
wherein when the sum of the magnitudes of the non-zero transform coefficients are greater than the threshold value, a first context is selected, and when the sum of the magnitudes of the non-zero transform coefficients are less than the threshold value, a second context is selected.

10. The apparatus of claim 9, further comprising:
wherein the reversing code is further configured to cause the at least one processor to reverse the sign of the non-zero transform coefficients based on an ordering of the non-zero transform coefficients in the array.

11. The apparatus of claim 9,
wherein the reversing code is further configured to cause the at least one processor to reverse the sign of the non-zero transform coefficients in an even position of the array when the value of the first bin is one, and reverse the sign of the non-zero transform coefficients in an odd position of the array when the value of the second bin is one.

12. The apparatus of claim 9, further comprising:
wherein the adding code is further configured to cause the at least one processor to add the non-zero transform coefficients to the array according to a decreasing order of magnitude values of the non-zero transform coefficients,
wherein the reversing code is further configured to cause the at least one processor to reverse the sign of the non-zero transform coefficients in an even position of the array when the value of the first bin is one, and
wherein the reversing code is further configured to cause the at least one processor to reverse the sign of the non-zero transform coefficients in an odd position of the array when the value of the second bin is one.

13. The apparatus of claim 9,
wherein the adding code is further configured to cause the at least one processor to add the non-zero transform coefficients to the array according to an increasing order of magnitude values of the non-zero transform coefficients, and
wherein the reversing code is further configured to cause the at least one processor to reverse the sign of the non-zero transform coefficients in an even position of the array when the value of the first bin is one, and reverse the sign of the non-zero transform coefficients in an odd position of the array when the value of the second bin is one.

14. The apparatus of claim 9,
wherein the adding code is further configured to cause the at least one processor to add the non-zero transform coefficients to the array according to a preset scanning order, and
wherein the reversing code is further configured to cause the at least one processor to reverse the sign of the non-zero transform coefficients in an even position of the array when the value of the first bin is one, and reverse the sign of the non-zero transform coefficients in an odd position of the array when the value of the second bin is one.

15. The apparatus of claim 14, wherein the preset scanning order is one from among a diagonal scan, a horizontal scan, and a vertical scan.

16. The apparatus of claim 9, further comprising:
comparing code configured to cause the at least one processor to compare a magnitude of each non-zero transform coefficient to a second threshold value,
wherein the reversing code is further configured to cause the at least one processor to not reverse a non-zero transform coefficient when the magnitude of the non-zero transform coefficient is below the second threshold value.

17. A non-transitory computer-readable storage medium storing instructions that cause a processor to:
receive a transform index which indicates a transform selection used for decoding an image block;
binarize the transform index using a preset number of bins;
for each of a selected set of bins of the binarized transform index, identify a group of non-zero transform coefficients in a transform coefficient block;
based on a value of a first bin of the selected set of bins of the binarized transform index and a value of a second bin of the selected set of bins of the binarized transform index, reverse a sign of the identified group of non-zero transform coefficients in the transform coefficient block;

add the non-zero transform coefficients to an array according to a preset order;
compare a sum of magnitudes of the non-zero transform coefficients to a threshold value; and
select a context for coding each bin of the transform index based on the comparing,
wherein when the sum of the magnitudes of the non-zero transform coefficients are greater than the threshold value, a first context is selected, and when the sum of the magnitudes of the non-zero transform coefficients are less than the threshold value, a second context is selected.

* * * * *